July 12, 1955
H. J. ECKWEILER, JR
2,713,134
RADIANT ENERGY CONTROLLED FOLLOW-UP SYSTEM
Filed May 27, 1949
4 Sheets-Sheet 1
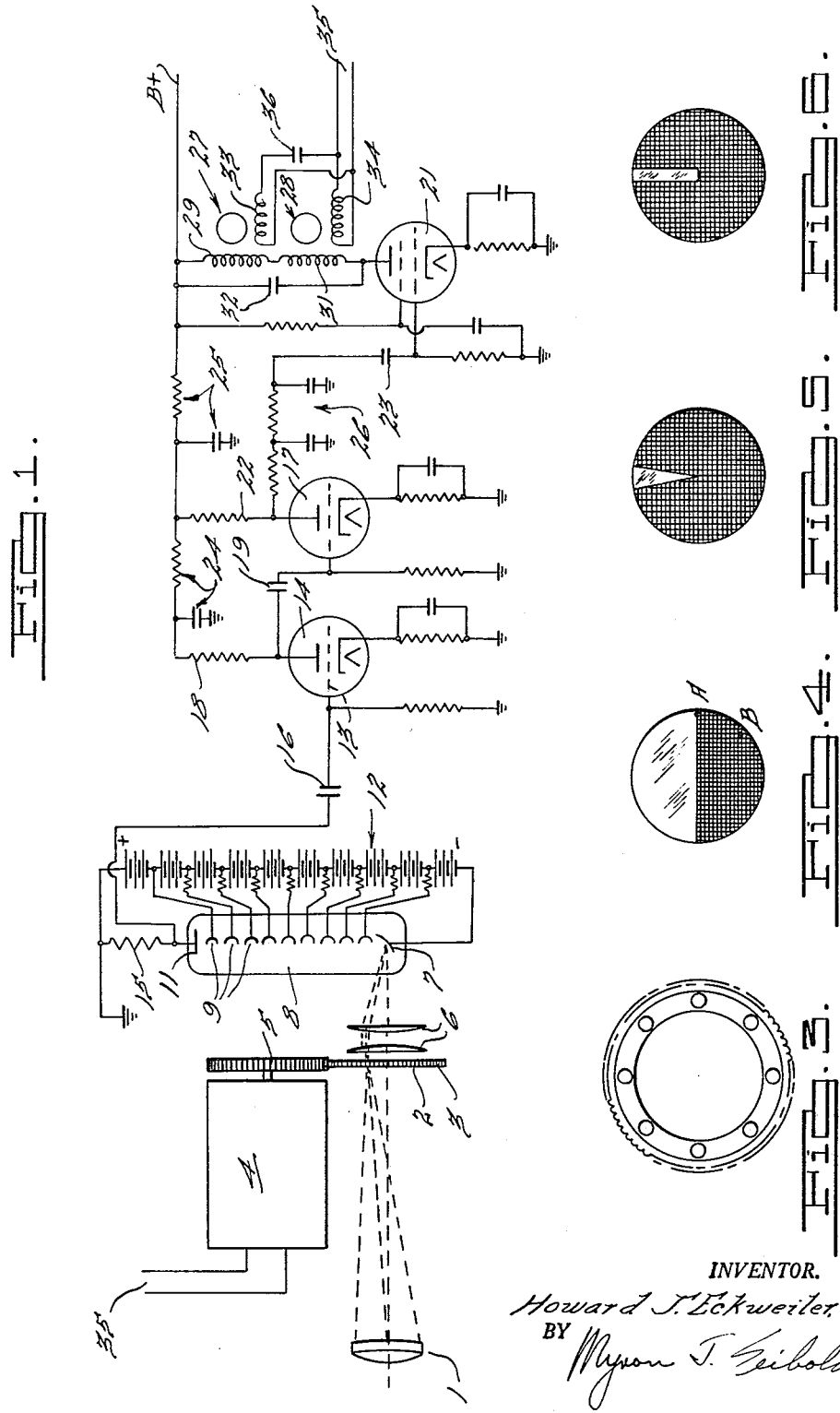
INVENTOR.
Howard J. Eckweiler, Jr.
BY
Myron J. Seibold
ATTORNEY.

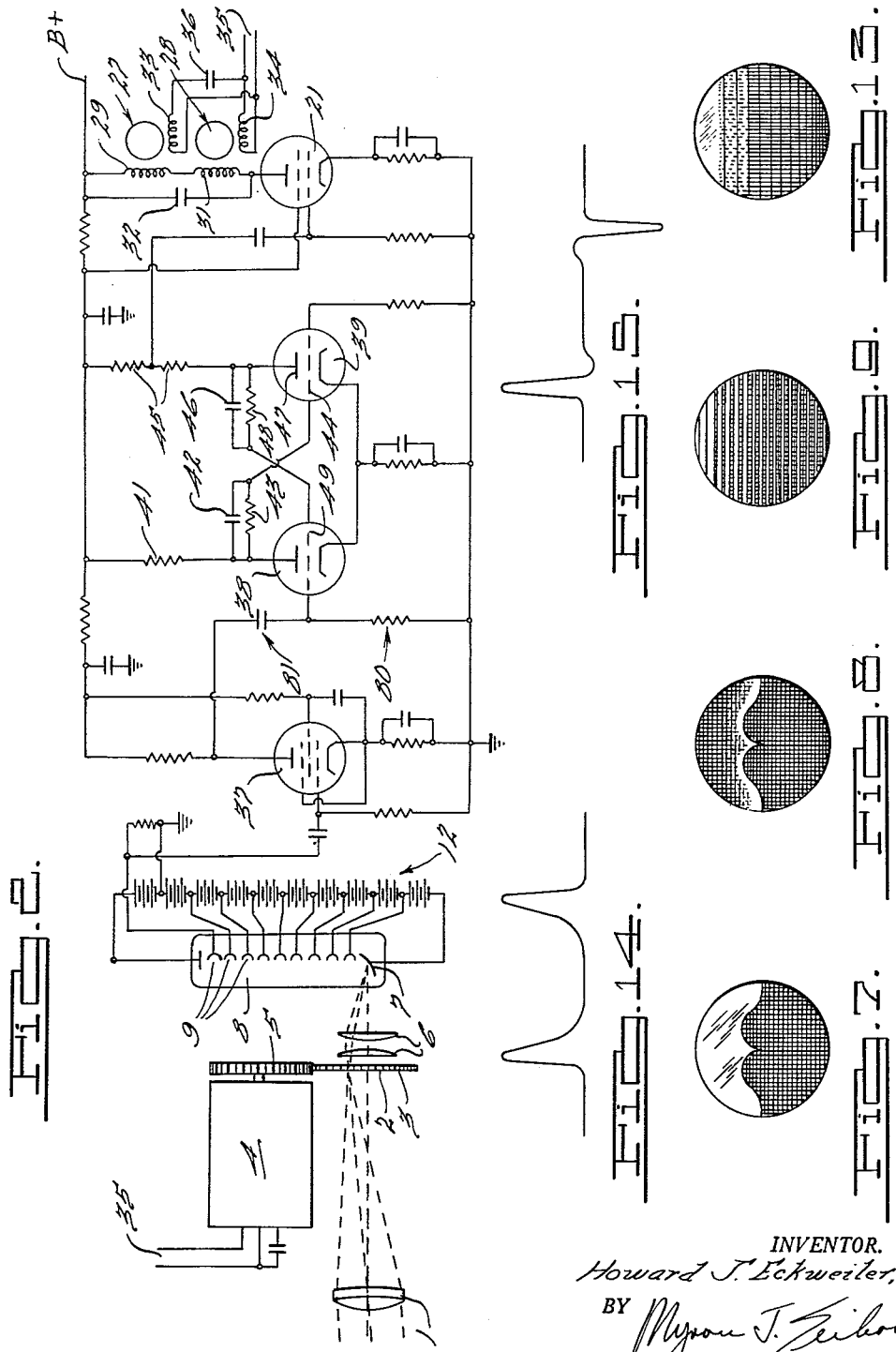

July 12, 1955     H. J. ECKWEILER, JR     2,713,134
RADIANT ENERGY CONTROLLED FOLLOW-UP SYSTEM
Filed May 27, 1949     4 Sheets-Sheet 3

INVENTOR.
Howard J. Eckweiler, Jr.
BY
Myron J. Seibold
ATTORNEY.

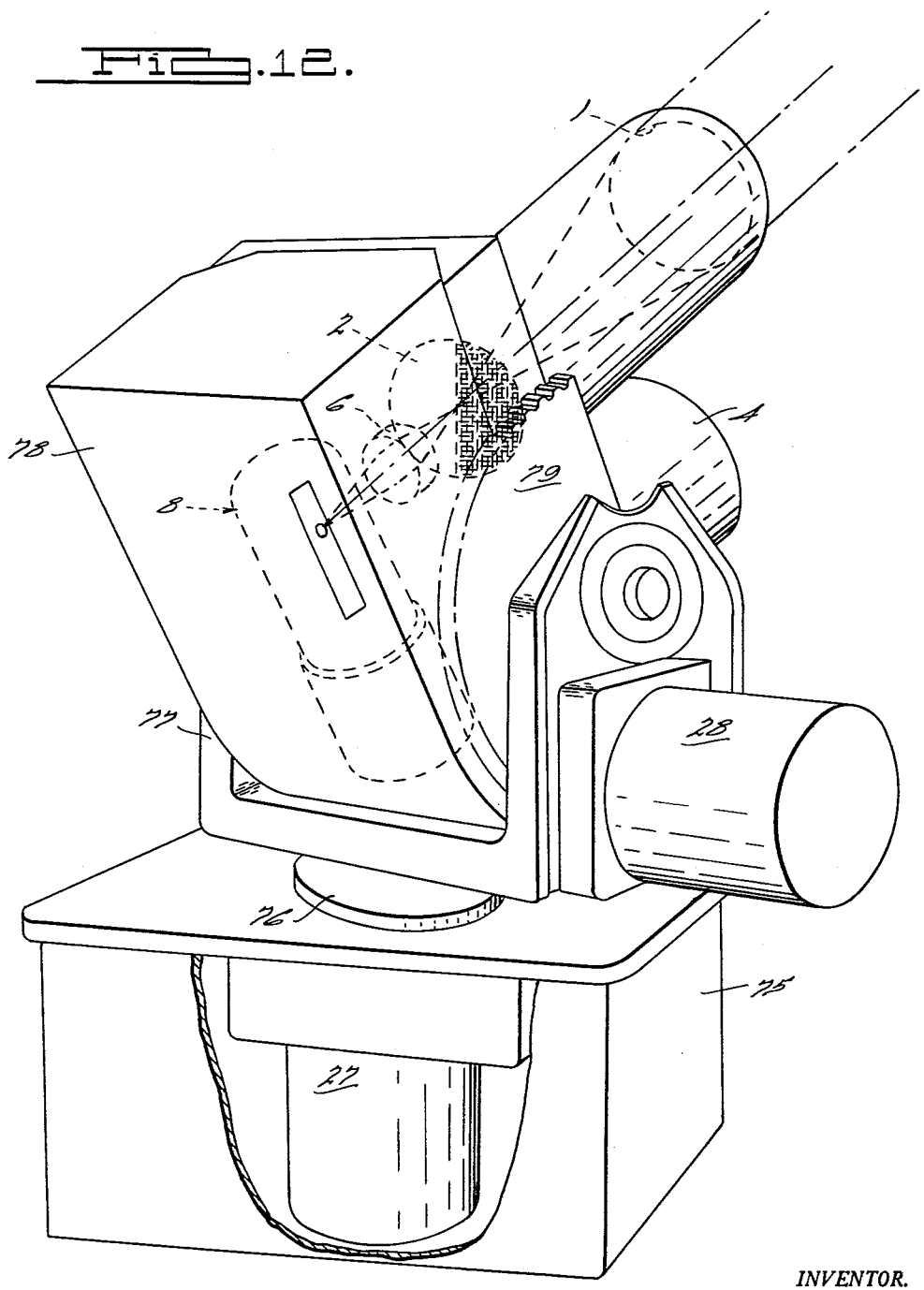

United States Patent Office 2,713,134
Patented July 12, 1955

2,713,134

RADIANT ENERGY CONTROLLED FOLLOW-UP SYSTEM

Howard J. Eckweiler, Jr., Elmhurst, N. Y., assignor, by mesne assignments, to Kollsman Instrument Corporation, Elmhurst, N. Y., a corporation of New York Application May 27, 1949, Serial No. 95,768

9 Claims. (Cl. 318—19)

This invention relates generally to a pick-off whereby a signal is modulated in conformity with two positional coordinates. The pickoff, which may be optical or electrical, ultimately provides an electrical signal whose phase and amplitude when related to a periodic reference voltage connotes the positional coordinates. For follow up purposes, the signal is fed into the signal winding of each of two two-phase servomotors which function in quadrature; the reference voltage and its 90-degree displacement being respectively fed into the two other windings of the said servomotors.

An object of the invention is the provision of a scanning system as above described of general application and with any condition variable or variables.

Another object of the invention is the provision of a scanning system as above described in which the variables are the coordinates of a light spot with respect to the center of rotation of a scanning shutter, in which deviation of the spot from the center produces the signal voltage.

Another object of the invention is to provide a scanning system wherein the deviation of a light spot from a desired point is resolved into voltage components at right angles to each other, with the components acting to restore the coincidence of the light spot and point.

Another object of the invention is the provision of a scanning system in accordance with the preceding objects in which the deviation of the light spot produces a voltage of constant frequency but variable in phase angle to vary the magnitude and phase of the two component voltages to vary the direction and magnitude of the restoring force.

Another object of the invention is a scanning system in accordance with each of the preceding objects in which the voltage produced by the deviation varies substantially only in its phase angle with respect to a supply voltage.

Another object of the invention is a scanning system in accordance with the first four objects in which the voltage produced by the deviation varies not only in the phase angle between its full cycles and cycles of supply voltage, but also varies in the relative duration of the dissimilar pulses in a full cycle.

Another object of the invention is a scanning system in accordance with the preceding objects in which the voltage produced by the deviation results from a scanning shutter driven synchronously with the supply voltage so that the deviation voltage has substantially the same frequency as the supply voltage and in which the supply and deviation voltages are fed to electrical motors which are displaced 90° both electrically and mechanically to produce the desired restoration of coincidence of spot and point.

Another object of the invention is the provision of varied shutter forms which may be utilized in scanning systems in accordance with the preceding objects so as to vary the characteristics of the voltage produced by the deviations and the energy supplied to the restoring means.

Other objects and features of the invention will be readily apparent to those skilled in the art from the specification and appended drawings illustrating certain preferred embodiments in which:

Figure 1 shows a schematic representation of one form of the scanning system.

Figure 2 is a schematic showing of another form of the scanning system according to the invention.

Figure 3 is an elevational detail of the rotatable annular holder for the shutter of the scanning system.

Figures 4 through 9 and 13 show a variety of shutter forms usable in the scanning system.

Figure 12 is a perspective schematic view of a star or other light source follower utilizing the scanning system.

Figures 14 and 15 are waveforms of the outputs respectively of the phototube and differentiating network of the scanning system of Figure 2.

Figure 10:
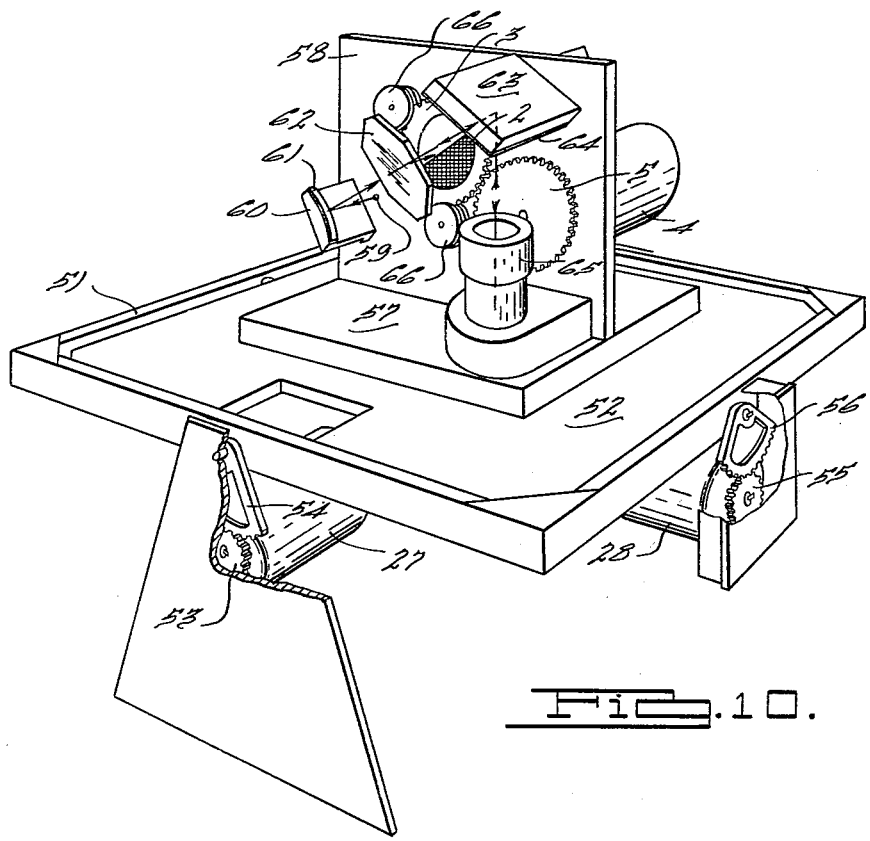
Figure 10 is a perspective schematic view of a horizontal reference or automatic leveling apparatus employing the scanning system.

The scanning system of the present invention, as illustrated in Figure 1, includes a lens 1 focusing light rays from a source, not shown, upon a shutter 2 (indicated but not shown) mounted in a geared annular holder 3 which is driven by a synchronous motor 4 through a gear 5. After the beam of light passes through the shutter, it is again focused by lens system 6 to strike the cathode 7 of a photoelectric tube 8 having a plurality of secondary electron emitters 9 and an anode 11. A voltage gradient is produced through the phototube 8 by means of the tapped power supply 12 to give each of the plurality of secondary electron emitters 9 a higher voltage than the preceding element.

The output of photoelectric tube 8 is applied to grid 13 of a first electronic amplifier tube 14 by means of a load resistor 15 and coupling condenser 16. The output of tube 14 is applied to the grid of a second electronic amplifier tube 17 through the load resistor 18 and coupling condenser 19. The output of tube 17 is applied to the control grid of a power amplifier tube 21 through a load resistor 22 and coupling condenser 23. Tubes 14 and 17 have plate supply decoupling filters shown schematically at 24 and 25 and the output of tube 17 is filtered at 26 by two resistor condenser combinations to bypass undesirable frequencies.

The output of the power amplifier tube 21 is fed through one winding of each of a pair of restoring motors 27 and 28, these windings being indicated at 29 and 31 respectively. A capacitor 32 across the windings 29 and 31 forms therewith a circuit resonant at supply frequency. The second windings 33 and 34 of the motors 27 and 28 are fed from the supply 35, the winding 33 being fed through a phase shifting condenser 36 which advances the current through it by 90° relative to the current in winding 34.

The operation of the scanning system as shown in Figure 1 is as follows:

Light rays from lens 1 are focused to converge to a spot in the plane of the shutter 2. The shutter 2 is mounted in a geared annular holder 3 and is driven through a gear 5 by a 2-pole synchronous motor 4 which has a polarized armature to give a unique correspondence between exciting phase and armature angle. In this explanation of the mechanism, a line frequency of 400 cycles will be used. The shutter then is revolving at 400 revolutions per second and cuts the beam of light at that rate. The beam of light passes through the shutter disc when it falls on an opening and is directed by lens system 6 to strike upon the cathode 7 of the phototube 8. The length of time that the light is permitted to strike the cathode 7 of the phototube 8 is determined by the construction of the opaque and transparent positions of the shutter disc 2.

The time phase of the cut-in and cut-off points and hence the time phase of the phototube energy pulse with relation to the supply voltage will vary with the position of the light beam on the shutter area.

The phototube output pulses are applied to the grid 13 of the first electronic amplifier tube 14 and are amplified by the associated tubes and circuits as previously described.

The time phase relations of the current flowing through windings 29 and 31 with respect to the currents flowing through windings 33 and 34 determine the speed and direction of rotation of the restoring motors 27 and 28. This time phase relation is determined by the angular position of the light spot on the shutter plane, so that the proper signal will be given to the motors to restore the coincidence of the light spot and the center of rotation of the shutter disc. This signal voltage will in effect be the resultant of two component voltages in quadrature cooperating with the supply voltages.

For the purpose of this explanation, a position of time zero will be considered as any place along the 0° line of a polar coordinate representation and a clockwise direction of rotation will be assumed for the shutter. From this general positioning of the point of reference, the cut-in time for the excitation of the phototube can be ascertained to determine the phase difference between the current through the windings 29 and 31 and the excitation current of windings 33 and 34. For example, assume that the light spot is at position A on the shutter disc of Figure 4, the pulse produced by the focusing of the light beam upon the cathode 7 of the phototube 8 would cause an oscillating current to flow through the windings 29 and 31 which would be in phase with the current flowing in the winding 34 of motor 28. The current in the winding 33 of motor 27 is 90° in advance of the current in winding 34 of motor 28 due to the effect of the reactance of capacitor 36 and will therefore be 90° out of phase with the current in the windings 29 and 31. Under these conditions, motor 28 would not be energized for rotation, since it has no quadrature component, but motor 27 would have maximum excitation and would be caused to rotate. By the proper adaptation of this motor rotation, as will be explained in connection with Figures 10 and 12, the coincidence of the light spot and the rotational center of the shutter disc can be restored.

If the light spot should move to point B on the shutter disc of Figure 4, the pulse produced by the phototube 8 would cause an oscillating current to flow in windings 29 and 31 which would be approximately 45° behind the excitation current of winding 34 and 135° behind the current in winding 33. This phase difference in the field winding excitations may be resolved into components in quadrature and will cause both motors 27 and 28 to rotate and through proper adaptation will cause the light spot to coincide with the center of rotation of the shutter.

The light spot on the shutter disc will not be a point but will have an appreciable circular area and there will be a progressive diminution of the modulation factor of the shutter as the spot progressively overlies the center of rotation of the shutter, becoming zero when the center of the spot and shutter are coincident. Consequently, the magnitude of the signal voltage will be a function of the amount of displacement of the centers and the motor speeds will, therefore, decrease as coincidence is approached and become zero when the centers coincide.

The shutter discs shown in Figures 5, 6, 7, 9 and 13 would have substantially the same effect upon the phase relationship between the current in the windings 29 and 31 and the currents in the field windings 33 and 34 as the shutter disc of Figure 4.

The shutter disc of Figure 7 provides an additional feature in that the curved edges between opaque and transparent portions effect a change in the cut-in and cut-out points and duration of pulse as the light spot is moved closer and closer to the center of the shutter, effectively reducing the amplitude of the reference frequency component of the signal. This provides a means for producing a variable control over the centering of the light spot through the motors as coincidence of the light spot and the center of rotation is approached. The combination of the changing phase control and the changing length of the pulse produced by this shutter provides a means whereby hunting of the motors as beam approaches the center of rotation of the shutter may be decreased.

The shutter disc of Figure 5 operates the same as that of Figure 4, but the length of the timing pulse is less due to the lessened segment of the transparent portion. The time of the pulse will be uniform regardless of the position of the light spot on the shutter outside the aforementioned interval of overlapping of image and shutter center.

The shutter disc of Figure 6 produces a pulse whose duration is determined by the width of the rectangular transparent portion and which varies with the radial distance of the light spot from the center of rotation since with a constant angular velocity the time the light will fall on the cathode 7 will decrease as the radial distance of the light spot from the center of rotation increases.

Figure 13 shows a light filtering shutter which has a linearly variable transmission from transparency to opacity across one diameter and uniform transmission along all chords normal to this diameter. The shutter of Figure 9 is formed with a multiplicity of transparent and opaque regions of very fine half-tone character to approximate the transmission characteristics of the shutter of Figure 13. Both of these shutters (Figures 9 and 13) produce a phototube output which gives a sinusoidal signal in the amplifier circuit shown in Figure 1. The amplitude and phase of this signal directly give the central polar coordinates of the light spot on either of these shutters, and the velocities of the two restoring motors are directly proportional to the cartesian coordinates of this spot with the origin at the shutter center of rotation.

A modified form of the invention shown in Figure 2 comprises the same general features as the arrangement described above. The principal differences lie in the type of shutter and the type of amplifier appropriate to the pulse modulation afforded by the shutter. The shutter, shown in Figure 8, comprises an opaque disc having two curved radial slits therein. These slits have variable light transmission in the tangential direction as illustrated in Figure 8. The lower opaque domain of the shutter has as its boundary the high transmission portion of the slit while the upper opaque domain gradually shades into the high transmission portion of the slit. As the shutter is rotated, the slits permit the beam of light to strike the cathode 7 of the phototube 8 thereby producing periodically recurrent paired pulses in the output of the phototube. These pulses are characterized by rapid rise and slow decay alternating with slow rise and rapid decay as shown in Figure 14. When the light spot moves toward the center of the shutter, the time intervals between the pulse peaks become more and more dissimilar due to the curved form of the slits.

The pulses produced in the output of the phototube 8 are amplified through tube 37 and fed to a conventional differentiating network consisting of the resistor 80 and condenser 81 combination in the grid circuit of tube 38. The resultant output of this network is a series of pulses alternating in polarity as shown in Figure 15. These pulses are fed to the grid of tube 38 which, in conjunction with tube 39, forms the well-known Eccles-Jordan switching circuit. In this circuit only one tube can be made to conduct at a time. Upon triggering by a positive pulse, tube 38 conducts which causes tube 39 to cut off, conversely triggering by a negative pulse causes tube 38 to cut off and tube 39 to conduct.

The output of the trigger circuit, therefore, as the light spot moves from the rim of the shutter to the center of the shutter, varies from a symmetrical rectangular wave to a rectangular wave having a short pulse in one direction of potential and a longer pulse in the opposite direction of potential.

The output of the trigger circuit is applied to the grid of the amplifier tube 21 whose load is again the resonant tank circuit formed by the windings 29 and 31 of motors 27 and 28 and capacitor 32 of Figure 1.

In Figures 10 and 12 there are shown schematically two applications for the invention. In Figure 10 there is shown an automatic platform leveling structure and in Figure 12 there is shown an automatic star follower telescope control. It will be understood that these are but illustrative examples of simple structures showing applications of the invention which may, of course, be utilized in a multiplicity of other embodiments.

In the platform leveling embodiment of Figure 10, the motors 27 and 28 are utilized to rotate an outer frame 51 and an inner platform 52, respectively, about axes disposed at 90° with respect to each other.

The motor 27 is mounted on a fixed support and drives a gear 53 through suitable reduction gearing, not shown, meshing with a sector 54 rigid with the frame 51, the frame 51 being pivoted in fixed supports with its axis aligned with the axis of the sector 54. The motor 28 is mounted on the frame 51 and drives through suitable reduction gearing (not shown), a gear 55 meshing with a sector 56 keyed on the shaft carrying platform 52 and pivoting in frame 51.

Mounted on the platform 52 are a supporting base 57 and upright supporting plate 58. Mounted on the plate 58 are a pinhole 59, a support 60 having a reflecting mirror 61 mounted thereon, a reflecting and transmitting mirror 62, a support 63 having a reflecting mirror 64 mounted thereon, the shutter holder 3 and its shutter disc 2, supported on three bearing wheels 66 (one not shown) are driven by gear 5 attached to synchronous driving motor 4. An optical level reference is shown at 65 and the phototube and amplifier circuit are hidden behind supporting plate 58.

A lamp (not shown) mounted behind plate 58 constitutes a source of light which is directed through pinhole 59 in plate 58 to strike a reflecting mirror 61 on support 60 as shown by arrows in Figure 10. The beam of light so produced is passed through the transmitting-reflecting mirror 62 to the mirror 64 which in turn redirects the beam toward the optical level reference 65 which is shown in section in Figure 11. The optical level gravity reference includes a reflecting surface which is normally level and returns the beam of light to mirror 64 in a direction dependent upon the position of the plate 52 with respect to the level plane. This returned beam is directed by mirror 64 to the reflecting surface of mirror 62 which in turn redirects the beam so as to pass it through the shutter 2 toward the phototube and amplifier system.

Deviation of the platform 52 from the level plane results in a deviation of the light beam from the center of rotation of the shutter disc 2. The light beam deviation, as explained in connection with Figures 1 and 2, produces a signal voltage as determined by the direction of the deviation. The vector of this supply voltage may be resolved into two components at right angles to each other corresponding to the coordinates of the vector. These component voltages in one winding each of the motors 27 and 28 cooperate with the supply voltage fed in quadrature to the other windings of the motors to effect rotation of frame 51 and platform 52 about their axes so as to restore the platform 52 to the level plane. The quadrant into which the beam of light deviates and hence the phase angle of the signal voltage will be determined by the position of the tilt angle of the platform 52 so that motors 27 and 28 will rotate in proper directions to restore the light spot to the center of rotation of the shutter 2 with the platform 52 in the level plane.

Figure 11:
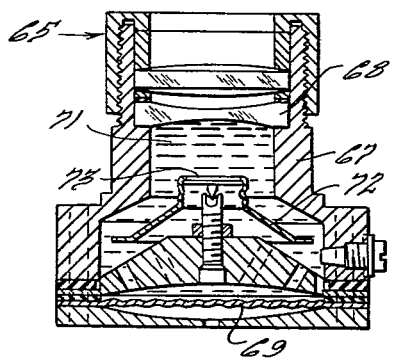
Figure 11 is a vertical sectional view of an optical level reference used in Figure 10.

The optical lever reference 65, shown in section in Figure 11, comprises an outer casing 67 closed by lens 68 and flexible diaphragm 69. Within the case 67 is a damping fluid 71 in which there is pivotally mounted for universal tilting movement a pendulous conical skirt 72 carrying an upper reflecting mirror 73 from which the light beam is reflected. A pendulous mirror optical reference of this general type is described and claimed in the copending application of Victor E. Carbonara, Serial No. 31,928, filed June 9, 1948 for Horizontal Reference.

In the automatic star tracker of Figure 12, there is schematically illustrated a base 75 in which is disposed the motor 27 mounted to drive a support 76 about a substantially vertical axis. Upon the support 76 is a supporting fork 77 in which is journalled an enclosure 78 for the optical system which includes the objective lens 1, the shutter disc 22, focusing lens 6, and photoelectric tube 8. Rigid with the container 78 is a sector 79 with which meshes a gear (not shown) driven by the motor 28.

The operation of the automatic star tracker of Figure 12 will follow those described in connection with Figures 1 and 2. Deviation of the star image from the center of rotation of the shutter disc will again produce a signal voltage which, suitably amplified, is fed to one winding each of the motors 27 and 28, the other windings of which are fed in quadrature from the supply. The signal voltage will again constitute, in effect, the resultant of two component voltages having a phase displacement of 90°, with the component voltages cooperating with the supply voltages to the servomotors 27 and 28 to effect the proper rotation of the telescope, about the vertical axis by the motor 27 and about the horizontal axis by motor 28 so as to restore the star image to the center of rotation of the shutter 2.

The invention herein described is of general application insofar as the scanning or position pick-off system may be utilized with respect to any condition variable or variables to produce a signal voltage which cooperates with a supply voltage to produce resultant indications or forces in multiple directions. Under the invention, the modulation of the system may be pulse, phase, frequency or amplitude, as desired. It will be understood, of course, that the periodic reference voltage described herein is not necessarily derived from an external source, but may be taken from either a generator or commutator driven by the shutter motor, as is well known in the art. It will also be understood that where the rotary scanning is utilized that it is immaterial whether the shutter or image has rotated, since it is the relative motion which is controlling.

While certain preferred embodiments of the invention have been specifically disclosed, it is understood that the invention is not limited thereto, as many variations will be readily apparent to those skilled in the art and the invention is to be given its broadest possible interpretation within the terms of the following claims. While, as explained above, the light spot may have a circular area to produce a diminution of the modulation factor of the shutter as the spot progressively overlies the center of rotation of the shutter, in some cases this may not be desired and the spot may be focused to substantially a point. As used in the appended claims, the term "spot" is intended to cover both the point and area arrangements.

What is claimed is:

1. In a scanning system, a scanning shutter, means for directing a light beam through said shutter forming a light spot thereon, means for producing relative motion between said light beam and shutter, means for producing a signal voltage whose time phase and amplitude vary with the relative positions of the light spot and shutter, means providing a reference voltage of the same frequency as the signal voltage, a servomotor, and means feeding said servomotor from said signal and reference voltages, said shutter comprising a disc having a portion of its surface transparent, and a portion opaque, the dividing line between said opaque and transparent portions being three sides of a rectangle, two of said sides intersecting the circumference of said disc, the movement of said light beam away from the center of said disc causing the shortening of pulses of said signal voltage.

2. In a scanning system, a scanning shutter, means for directing a light beam through said shutter forming a light spot thereon, means for producing relative rotation between said light beam and shutter, means for producing a signal voltage whose time phase is determined by the angular position of the light spot on the shutter and whose amplitude is determined by the displacement of the center of the light spot from the center of rotation of the light beam and shutter, means providing a reference voltage of the same frequency as the signal voltage, said shutter comprising a disc having an opaque portion, a transparent portion and a variable light transmission portion, said transparent portion being two curved radial bands, the relative rotation of said disc causing said signal voltage to have a plurality of paired pulses.

3. In a scanning system, a scanning shutter, means for directing a light beam through said shutter forming a light spot thereon, means for producing relative rotation between said light beam and shutter, means for producing a signal voltage, means providing a reference voltage of the same frequency as the signal voltage, a pair of two-phase servomotors, means for feeding one phase of each servomotor from the signal voltage, and means for feeding the other phases of the servomotors from the reference voltage in quadrature, whereby the operation of the servomotors is controlled by the coordinates of the position of the light spot on the shutter, said shutter comprising a disc having an opaque portion, a transparent portion and a variable light transmission portion, said transparent portion being two curved radial bands, said variable light transmission band being a curved band conforming with and adjacent to said transparent portion, said opaque portion comprising two domains, one of said domains being adjacent said transparent portion and the other of said domains being adjacent said variable light transmission portion; said variable light transmission portion being opaque near said opaque domain and gradually varying to complete transmission near said transparent domain; the relative rotation of said shutter causing said means for producing a signal voltage when said light beam moves towards the center of said shutter to produce a signal of periodically recurring paired pulses, said pulses having a rapid rise and slow decay alternating with a slow rise and rapid decay with the time interval between said pulses varying.

4. In a scanning system, a scanning shutter, means for directing a light beam through said shutter forming a light spot thereon, means for producing relative rotation between said light beam and shutter, means for producing a signal voltage whose time phase is determined by the angular position of the light spot on the shutter and whose amplitude is determined by the displacement of the center of the light spot from the center of rotation of the light beam and shutter, means providing a reference voltage of the same frequency as the signal voltage, a pair of two-phase servomotors, means for feeding one phase of each servomotor from the signal voltage, means for feeding the other phases of the servomotors from the reference voltage in quadrature, whereby the operation of the servomotors is controlled by the coordinates of the position of the light spot on the shutter, and means responsive to the operation of said servomotors for restoring coincidence of the center of the light spot and the center of rotation of said light beam and shutter, said variable light transmission band being a curved band conforming with and adjacent to said transparent portion, said opaque portion comprising two domains, one of said domains being adjacent said transparent portion and the other of said domains being adjacent said variable light transmission portion; said variable light transmission portion being opaque near said opaque domain and gradually varying to complete transmission near said transparent domain; the relative rotation of said shutter causing said means for producing a signal voltage when said light beam moves towards the center of said shutter to produce a signal of periodically recurring paired pulses, said pulses having a rapid rise and slow decay alternating with a slow rise and rapid decay with the time interval between said pulses varying.

5. In a scanning system, a scanning shutter, means directing a light beam through said shutter forming a light spot thereon, means for producing relative rotation between said light beam and shutter, means for producing a signal voltage whose time phase is determined by the angular position of the light spot on the shutter and whose amplitude is determined by the displacement of the center of the light spot from the center of rotation of the shutter, said shutter comprising a disc having a portion of its surface transparent and a portion opaque, the relative circumferential lengths of the transparent and opaque portions varying with the radial distance from the center of rotation of the shutter so that said shutter causes said light beam to be interrupted for varying periods as the shutter is rotated and as the beam is moved toward the center of the shutter, means providing a reference voltage of the same frequency as the signal voltage, a pair of two phase servomotors, means for feeding one phase of each servomotor from the signal voltage, means for feeding the other phases of the servomotors from the reference voltage in quadrature, whereby the operation of the servomotors is controlled by the coordinates of the position of the light spot on the shutter, and means responsive to the operation of said servomotors for restoring coincidence of the center of the light spots and the center of rotation of said shutter.

6. In a scanning system, a scanning shutter, means for directing a light beam through said shutter forming a light spot thereon, means for producing relative rotation between said light beam and shutter, means for producing a signal voltage whose time phase is determined by the angular position of the light spot on the shutter and whose amplitude is determined by the displacement of the center of the light spot from the center of rotation of the shutter, said shutter comprising a disc having portions of its surface transparent and portions opaque, said portions comprising alternate parallel transparent and opaque strips progressively varying in relative thickness from one edge of the disc to the diametrically opposite edge so that said shutter causes said light beam to be interrupted for varying periods and at a varying rate as the shutter is rotated and as the beam is moved toward the center of the shutter, means providing a reference voltage of the same frequency as the signal voltage, a pair of two phase servomotors, means for feeding one phase of each servomotor from the signal voltage, means for feeding the other phases of the servomotors from the reference voltage in quadrature, whereby the operation of the servomotors is controlled by the coordinates of the position of the light spot on the shutter, and means responsive to the operation of said servomotors for restoring coincidence of the center of the light spot and the center of rotation of said shutter.

7. In a scanning system, a scanning shutter, means for directing a light beam through said shutter forming a light spot thereon, means for producing relative rotation between said light beam and shutter, means for producing a signal voltage whose time phase is determined by the angular position of the light spot on the shutter and whose amplitude is determined by the displacement of the center of the light spot from the center of rotation of the shutter, said shutter comprising a disc having a portion of its surface transparent and a portion opaque, the dividing line between said opaque and transparent portions being a curved line effecting a change in the cut-in and cut-out and duration of said signal voltage as said light beam moves relative to the center of said shutter, means providing a reference voltage of the same frequency as the signal voltage, a pair of two phase servomotors, means for feeding one phase of each servomotor from the signal voltage, means for feeding the other phases of the servomotors from the reference voltage in quadrature, whereby the operation of the servomotors is controlled by the coordinates of the position of the light spot on the shutter, and means responsive to the operation of said servomotors for restoring coincidence of the center of the light spot and the center of rotation of said shutter.

8. In a scanning system, a scanning shutter, means for directing a light beam through said shutter forming a light spot thereon, means for producing relative rotation between said light beam and shutter, means for producing a signal voltage whose time phase is determined by the angular position of the light spot on the shutter and whose amplitude is determined by the displacement of the center of the light spot from the center of rotation of the shutter, said shutter comprising a disc having a portion of its surface transparent and a portion opaque such that as said shutter is rotated and as said beam is moved toward the center of said shutter the beam is interrupted for varying periods of time, said interruption being a minimum at the periphery and a maximum at the center of said shutter, means providing a reference voltage of the same frequency as the signal voltage, a pair of two phase servomotors, means for feeding one phase of each servomotor from the signal voltage, means for feeding the other phases of the servomotors from the reference voltage in quadrature, whereby the operation of the servomotors is controlled by the coordinates of the position of the light spot on the shutter, and means responsive to the operation of said servomotors for restoring coincidence of the center of the light spot and the center of rotation of said shutter.

9. In a scanning system, a scanning shutter, means for directing a light beam through said shutter forming a light spot thereon, means for producing relative rotation between said light beam and shutter, means for producing a signal voltage whose time phase is determined by the angular position of the light spot on the shutter and whose amplitude is determined by the displacement of the center of the light spot from the center of rotation of the shutter, said shutter comprising a disc having a portion of its surface transparent and a portion opaque such that as said shutter is rotated and as said beam is moved toward the center of said shutter the beam is interrupted for varying periods of time, and for producing a variable control over the centering of said light beam as coincidence of said light beam and the center of said disc is approached to reduce hunting, said interruption being a minimum at the periphery and a maximum at the center of rotation, means providing a reference voltage of the same frequency as the signal voltage, a pair of two phase servomotors, means for feeding one phase of each servomotor from the signal voltage, means for feeding the other phases of the servomotor from the reference voltage in quadrature, whereby the operation of the servomotors is controlled by the coordinates of the position of the light spot on the shutter, means responsive to the operation of said servomotors for restoring coincidence of the center of the light spot and the center of rotation of said shutter.

References Cited in the file of this patent

UNITED STATES PATENTS

| 2,462,081 | Esval | Feb. 22, 1949 |
| 2,462,925 | Varian | Mar. 1, 1949 |

FOREIGN PATENTS

| 33,746 | Netherlands | Oct. 15, 1934 |